(12) United States Patent
Lee et al.

(10) Patent No.: US 9,377,883 B2
(45) Date of Patent: Jun. 28, 2016

(54) TOUCH SENSING METHOD, RECORDING MEDIUM IN WHICH PROGRAM FOR REALIZING THE SAME IS RECORDED, AND TOUCH SENSING SYSTEM

(75) Inventors: Dong-Won Lee, Yongin (KR); Hee-Chul Hwang, Yongin (KR); Jong-Woong Park, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 794 days.

(21) Appl. No.: 13/240,955

(22) Filed: Sep. 22, 2011

(65) Prior Publication Data

US 2012/0182235 A1    Jul. 19, 2012

(30) Foreign Application Priority Data

Jan. 18, 2011   (KR) ........................ 10-2011-0004976

(51) Int. Cl.
*G06F 3/041*  (2006.01)
*G06F 3/044*  (2006.01)

(52) U.S. Cl.
CPC .............. *G06F 3/041* (2013.01); *G06F 3/0418* (2013.01); *G06F 3/044* (2013.01)

(58) Field of Classification Search
CPC ...................................................... G06F 3/041
USPC ............ 345/156, 173–178; 178/18.01–18.09, 178/18.11
See application file for complete search history.

(56) References Cited

U.S. PATENT DOCUMENTS

| 2005/0212777 | A1* | 9/2005 | Ing | G06F 3/0433 345/173 |
| 2009/0084611 | A1 | 4/2009 | Liao et al. | |
| 2009/0256817 | A1* | 10/2009 | Perlin | G06F 3/0233 345/174 |

FOREIGN PATENT DOCUMENTS

| KR | 10-2003-0071408 A | 9/2003 |
| WO | WO 2011080513 A2 * | 7/2011 |

*Primary Examiner* — Ilana Spar
*Assistant Examiner* — Jeffrey S Steinberg
(74) *Attorney, Agent, or Firm* — Lewis Roca Rothgerber Christie LLP (57) ABSTRACT

A touch sensing method for a touch screen including an image display device with a touch-sensitive screen. The method includes a filtering process that includes calculating an output signal of an $n^{th}$ frame from a sensing signal of the $n^{th}$ frame output from a touch sensing unit configured to sense touches of the touch-sensitive screen, the calculating using an equation $$F(n)=I(n)\times W(n)+F(n-1)\times[1-W(n)],$$

wherein $F(n)$ represents the output signal of the $n^{th}$ frame, $I(n)$ represents the sensing signal of the $n^{th}$ frame, $F(n-1)$ represents an output signal of an $(n-1)^{th}$ frame, and $W(n)$ represents a filtering coefficient; and outputting the output signal of the $n^{th}$ frame to an output end. The filtering coefficient is calculated by an equation $$W(n) = \frac{|I(n) - F(n-1)|}{R},$$

wherein R is a scale constant. The touch sensing method has high touch sensitivity in an environment with heavy noise while being capable of correctly detecting touch coordinates.

15 Claims, 5 Drawing Sheets

| | X | | | | | | | | | |
|---|---|---|---|---|---|---|---|---|---|---|
| | 1 | 2 | 3 | 4 | 5 | 6 | 7 | 8 | 9 | 10 |
| 1 | 0 | 0 | 0 | 0 | 0 | 0 | 0 | 0 | 0 | 0 |
| 2 | 0 | 0 | 0 | 0 | 0 | 0 | 0 | 0 | 0 | 0 |
| 3 | 0 | 0 | 0 | 0 | 0 | 5 | 0 | 0 | 0 | 0 |
| 4 | 0 | 0 | 0 | 0 | 1 | 29 | 18 | 0 | 0 | 0 |
| 5 | 0 | 0 | 0 | 0 | 0 | 1 | 0 | 0 | 0 | 0 |
| 6 | 0 | 0 | 0 | 0 | 0 | 0 | 0 | 0 | 0 | 0 |
| Y 7 | 0 | 0 | 0 | 0 | 0 | 0 | 0 | 0 | 0 | 0 |
| 8 | 0 | 0 | 0 | 0 | 0 | 0 | 0 | 0 | 0 | 0 |
| 9 | 0 | 0 | 0 | 0 | 0 | 0 | 0 | 0 | 0 | 0 |
| 10 | 0 | 0 | 15 | 3 | 0 | 0 | 0 | 0 | 0 | 0 |
| 11 | 0 | 0 | 0 | 0 | 0 | 0 | 0 | 15 | 0 | 0 |
| 12 | 0 | 0 | 0 | 0 | 0 | 0 | 0 | 0 | 0 | 0 |
| 13 | 0 | 0 | 0 | 0 | 0 | 0 | 0 | 0 | 0 | 0 |
| 14 | 0 | 0 | 0 | 0 | 0 | 0 | 0 | 0 | 0 | 0 |

TOUCH SENSING METHOD, RECORDING MEDIUM IN WHICH PROGRAM FOR REALIZING THE SAME IS RECORDED, AND TOUCH SENSING SYSTEM

CROSS-REFERENCE TO RELATED APPLICATION

This application claims priority to and the benefit of Korean Patent Application No. 10-2011-0004976, filed on Jan. 18, 2011 in the Korean Intellectual Property Office, the entire content of which is incorporated herein by reference.

BACKGROUND

1. Field

Aspects of embodiments of the present invention relate to a touch sensing method, a recording medium in which a program for realizing the touch sensing method is recorded, and a touch sensing system.

2. Description of Related Art

A touch screen of an image display device has a screen sensitive to touch by, for example, a finger or an object (such as a stylus). The touch screen can serve as an input device by, for example, allowing a user to select indicated content displayed on the screen to input a command of the user.

For example, the touch screen may be provided on the front face of the image display device and configured to convert a contact position of the finger or the object into an electrical signal corresponding to an instruction represented by the contact position. Therefore, the instruction selected at the contact position is received as an input signal.

Since the touch screen may in some applications replace an additional input device (such as a keyboard or a mouse) coupled to the image display device, the range of uses for touch screens is gradually increasing.

Methods of realizing a touch screen panel include a resistance layer method, a photo-sensing method, and an electrostatic capacity method. Among these, in the touch screen having the electrostatic capacity method, a change in electrostatic capacity generated when a human hand or an object contacts the touch screen is detected to correspond to a touch position. Therefore, a touch sensing system for analyzing sensing signals output from a plurality of sensing electrodes to sense the coordinates of the touch position is provided. However, this type of touch sensing system is sensitive to external noise, such that the probability of the touch sensing system erroneously operating in an area with heavy noise is very high.

To address this problem, in the conventional art, median filtering and IIR filtering have been proposed. However, these techniques remove noise using a fixed value and thus, their adaptability to working in multiple environments deteriorates. In addition, a center of gravity method has also been proposed to address this problem in the conventional art. However, in detecting touch coordinates (X, Y), noise cannot be sufficiently removed using only the center of gravity method.

SUMMARY

Accordingly, aspects of embodiments of the present invention are directed toward a touch sensing method having high touch sensitivity in an environment with heavy noise while still being capable of detecting correct touch coordinates, a recording medium in which a program for realizing the touch sensing method is recorded, and a touch sensing system.

In an exemplary embodiment of the present invention, a touch sensing method for a touch-sensitive screen of an image display device is provided. The method includes calculating an output signal of an $n^{th}$ frame and outputting the output signal of the $n^{th}$ frame to an output end. The calculating of the output signal of the $n^{th}$ frame is from a sensing signal of the $n^{th}$ frame that is output from a touch sensing unit configured to sense touches of the touch-sensitive screen to perform a filtering process. The calculating uses an equation $$F(n)=I(n)\times W(n)+F(n-1)\times[1-W(n)],$$

where F(n) represents the output signal of the $n^{th}$ frame, I(n) represents the sensing signal of the $n^{th}$ frame, F(n−1) represents an output signal of an $(n-1)^{th}$ frame, and W(n) represents a filtering coefficient. The filtering coefficient is calculated by an equation $$W(n)=\frac{|I(n)-F(n-1)|}{R},$$

where R is a scale constant.

A range of the filtering coefficient W(n) may satisfy 0≤W(n)≤1.

The touch sensing method may further include a first condition process, a second condition process, and a third condition process. The first condition process includes receiving the sensing signal of the $n^{th}$ frame output from the touch sensing unit, performing the filtering process when the sensing signal of the $n^{th}$ frame is no more than a first reference value, and transmitting the sensing signal to the second condition process when the sensing signal of the $n^{th}$ frame is larger than the first reference value. The second condition process includes transmitting the sensing signal to the third condition process when a sum obtained by adding the sensing signal transmitted from the first condition process to sensing signals of adjacent coordinates is no more than a second reference value, and outputting the sensing signal to the output end as the output signal of the $n^{th}$ frame when the sum is larger than the second reference value. The third condition process includes performing the filtering process when the sensing signal transmitted from the second condition process is no more than a third reference value, and outputting the sensing signal to the output end as the output signal of the $n^{th}$ frame when the sensing signal transmitted from the second condition process is larger than the third reference value.

The third reference value may be larger than the first reference value.

The second reference value may be larger than the first reference value and the third reference value.

The touch sensing method may further include replacing the output signal of the $n^{th}$ frame output to the output end by a sum obtained by adding sensing signals of adjacent coordinates to each other, replacing the sum by 0 when the sum is no more than a fourth reference value and replacing the sum by 1 when the sum is larger than the fourth reference value to perform a comparing process, and multiplying the 0 or 1 generated by the comparing process by the output signal of the $n^{th}$ frame.

In another exemplary embodiment according to the present invention, a recording medium is provided. The recording medium is for recording a program of realizing a touch sensing method for a touch-sensitive screen of an image display device. The touch sensing method includes calculating an output signal of an $n^{th}$ frame and outputting the output signal of the $n^{th}$ frame to an output end. The calculating of the output signal of the $n^{th}$ frame is from a sensing signal of the $n^{th}$ frame that is output from a touch sensing unit configured to sense touches of the touch-sensitive screen to perform a filtering process. The calculating uses an equation $$F(n)=I(n)\times W(n)+F(n-1)\times[1-W(n)],$$

where F(n) represents the output signal of the $n^{th}$ frame, I(n) represents the sensing signal of the $n^{th}$ frame, F(n−1) represents an output signal of an $(n-1)^{th}$ frame, and W(n) represents a filtering coefficient. The filtering coefficient is calculated by an equation $$W(n)=\frac{|I(n)-F(n-1)|}{R},$$

where R is a scale constant.

A range of the filtering coefficient W(n) may satisfy 0≤W(n)≤1.

The touch sensing method may further include a first condition process, a second condition process, and a third condition process. The first condition process includes receiving the sensing signal of the $n^{th}$ frame output from the touch sensing unit, performing the filtering process when the sensing signal of the $n^{th}$ frame is no more than a first reference value, and transmitting the sensing signal to the second condition process when the sensing signal of the $n^{th}$ frame is larger than the first reference value. The second condition process includes transmitting the sensing signal to the third condition process when a sum obtained by adding the sensing signal transmitted from the first condition process to sensing signals of adjacent coordinates is no more than a second reference value, and outputting the sensing signal to the output end as the output signal of the $n^{th}$ frame when the sum is larger than the second reference value. The third condition process includes performing the filtering process when the sensing signal transmitted from the second condition process is no more than a third reference value, and outputting the sensing signal to the output end as the output signal of the $n^{th}$ frame when the sensing signal transmitted from the second condition process is larger than the third reference value.

The third reference value may be larger than the first reference value.

The second reference value may be larger than the first reference value and the third reference value.

The touch sensing method may further include replacing the output signal of the $n^{th}$ frame output to the output end by a sum obtained by adding sensing signals of adjacent coordinates to each other, replacing the sum by 0 when the sum is no more than a fourth reference value and replacing the sum by 1 when the sum is larger than the fourth reference value to perform a comparing process, and multiplying the 0 or 1 generated by the comparing process by the output signal of the $n^{th}$ frame.

In yet another exemplary embodiment according to the present invention, a touch sensing system is provided. The touch sensing system includes a touch-sensitive screen of an image display device and a filter unit. The touch-sensitive screen includes a touch sensing unit configured to sense touches of the touch-sensitive screen. The filter unit is for calculating an output signal of an $n^{th}$ frame and outputting the output signal of the $n^{th}$ frame to an output end. The calculating of the output signal of the $n^{th}$ frame is from a sensing signal of the $n^{th}$ frame that is output from the touch sensing unit and uses an equation $$F(n)=I(n)\times W(n)+F(n-1)\times[1-W(n)],$$

where F(n) represents the output signal of the $n^{th}$ frame, I(n) represents the sensing signal of the $n^{th}$ frame, F(n−1) represents an output signal of an $(n-1)^{th}$ frame, and W(n) represents a filtering coefficient. The filtering coefficient is calculated by an equation $$W(n)=\frac{|I(n)-F(n-1)|}{R},$$

where R is a scale constant.

A range of the filtering coefficient W(n) may satisfy 0≤W(n)≤1.

The touch sensing system may further include a first sub condition unit, a second sub condition unit, and a third sub condition unit. The first sub condition unit is for receiving the sensing signal of the $n^{th}$ frame output from the touch sensing unit, for supplying the sensing signal to the filter unit when the sensing signal of the $n^{th}$ frame is no more than a first reference value, and for transmitting the sensing signal to the second sub condition unit when the sensing signal of the $n^{th}$ frame is larger than the first reference value. The second sub condition unit is for transmitting the sensing signal to the third sub condition unit when a sum obtained by adding the sensing signal transmitted from the first sub condition unit to sensing signals of adjacent coordinates is no more than a second reference value, and for outputting the sensing signal to the output end of the filter unit as the output signal of the $n^{th}$ frame when the sum is larger than the second reference value. The third sub condition unit is for supplying the sensing signal transmitted from the second sub condition unit to the filter unit when the sensing signal is no more than a third reference value, and for outputting the sensing signal to the output end of the filter unit as the output signal of the $n^{th}$ frame when the sensing signal is larger than the third reference value.

The third reference value may be larger than the first reference value.

The second reference value may be larger than the first reference value and the third reference value.

The touch sensing system may further include a replacing unit, a comparing unit, and an operating unit. The replacing unit is for replacing the output signal of the $n^{th}$ frame output to the output end of the filter unit by a sum obtained by adding sensing signals of adjacent coordinates to each other. The comparing unit is for replacing the sum by 0 when the sum is no more than a fourth reference value, and for replacing the sum by 1 when the sum is larger than the fourth reference value. The operating unit is for multiplying the 0 or 1 generated by the comparing unit by the output signal of the $n^{th}$ frame.

As described above, according to aspects of embodiments of the present invention, it is possible to provide a touch sensing method having high touch sensitivity in an environment with heavy noise while still being capable of detecting correct touch coordinates, a recording medium in which a program for realizing the touch sensing method is recorded, and a touch sensing system.

BRIEF DESCRIPTION OF THE DRAWINGS

The accompanying drawings, together with the specification, illustrate exemplary embodiments of the present invention, and, together with the written description, serve to better explain aspects and principles of the present invention.

DETAILED DESCRIPTION

Hereinafter, certain exemplary embodiments according to the present invention will be described with reference to the accompanying drawings. Here, when a first element is described as being coupled to a second element, the first element may be directly coupled to the second element or may be indirectly coupled to the second element via one or more third elements. Further, some of the elements that are not essential to understanding embodiments of the invention are omitted for clarity. In addition, like reference numerals refer to like elements throughout.

Aspects and characteristics of the present invention and methods of achieving aspects and characteristics of the present invention will be described more fully with reference to the accompanying drawings, in which exemplary embodiments of the invention are shown. This invention may, however, be embodied in many different forms and should not be construed as being limited to the embodiments set forth herein. In the drawings, when a part is coupled to another part, the part may be directly coupled to the other part, or the part may be electrically coupled to the other part with one or more elements interposed. In the drawings, parts that are not relevant to the present invention may be omitted for clarity of description. The same reference numerals in different drawings represent the same element, and thus their description may not be repeated.

Figure 1:
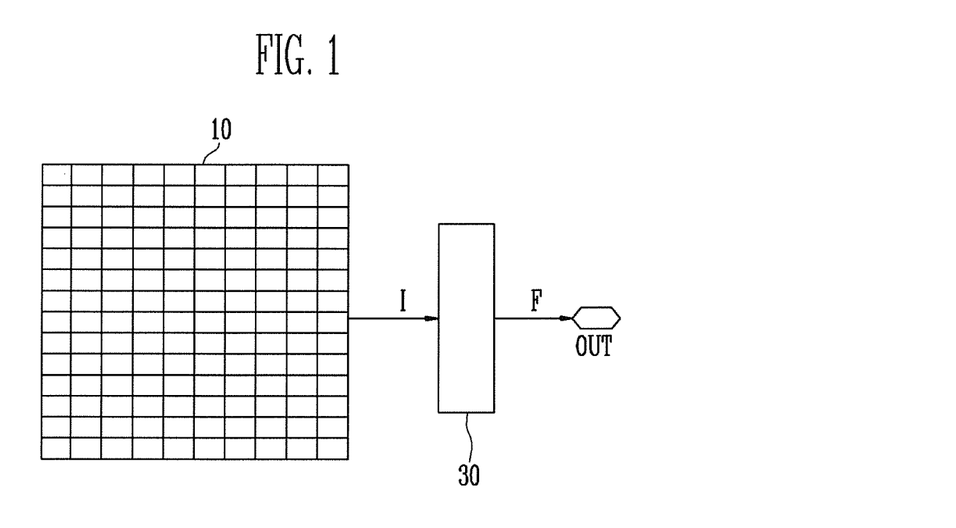
FIG. 1 is a view illustrating a touch sensing system according to a first embodiment of the present invention.

FIG. 1 is a view illustrating a touch sensing system according to a first embodiment of the present invention.

Referring to FIG. 1, the touch sensing system includes a filter unit 30. The filter unit 30 receives a sensing signal I detected by a touch sensing unit 10 and performs an operation (for example, a predetermined operation) on the sensing signal I to output a calculated output signal F to an output end OUT.

The touch sensing unit 10 is a touch sensor using an electrostatic capacity method including a plurality of sensing electrodes that output sensing signals I from the sensing electrodes every frame period. The sensing signals I output from the touch sensing unit 10 have voltage values or current values corresponding to the electrostatic capacitances formed in the corresponding coordinates of the touch sensing unit 10, and are supplied to the filter unit 30. The touch sensing unit 10 may, for example, use a mutual capacitance method or a self capacitance method. Since the structures of these methods are well known, detailed description thereof will be omitted.

The equation used by the filter unit 30 in order to remove the noise included in the sensing signal I is as follows:

$$F(n) = I(n) \times W(n) + F(n-1) \times [1 - W(n)] \quad \text{[EQUATION 1]},$$

where the filtering coefficient W(n) is calculated using the following equation:

$$W(n) = \frac{|I(n) - F(n-1)|}{R}, \quad \text{[EQUATION 2]}$$

where the range of the filtering coefficient W(n) preferably satisfies 0≤W(n)≤1 (through appropriate selection of a scale constant R), and I(n) and F(n) are the sensing signal and calculated output signal, respectively, for the $n^{th}$ frame (that is, the current frame). It should be noted that the current output signal F(n) depends on the current sensing signal I(n) and the previous output signal F(n−1) (that is, the calculated output signal for the $(n-1)^{th}$ frame). Accordingly, a first calculated output signal F(1) could be set, for example, to the first output sensing signal I(1) and succeeding calculated output signals F(2), F(3), . . . calculated as in EQUATIONS 1 and 2 above.

Figure 2:
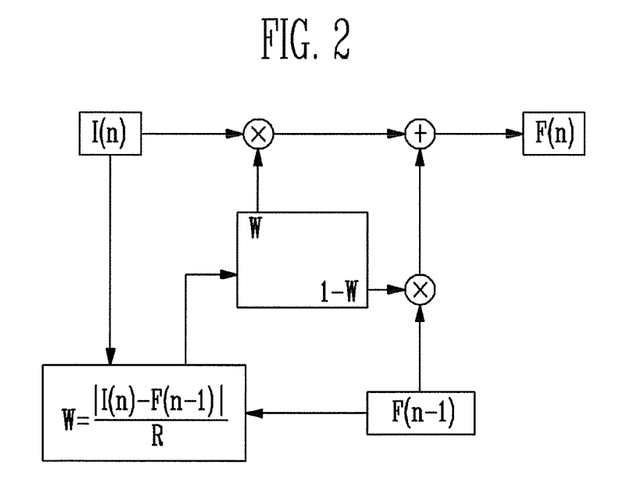
FIG. 2 is a view illustrating the operation of the filter unit of FIG. 1.

FIG. 2 is a view illustrating the operation of the filter unit 30 of FIG. 1.

The operation of the filter unit 30 will be described with reference to FIG. 2. In particular, the sensing signals I(n) output from an $n^{th}$ frame among the sensing signals I supplied every frame will be described as an example. The filter unit 30 calculates the output signals F corresponding to the sensing signals I output from the $n^{th}$ frame by applying EQUATIONS 1 and 2. That is, the output signal F(n) of the $n^{th}$ frame (that is, the current frame) of each of the coordinates is calculated using the sensing signal I(n) of the $n^{th}$ frame, the output signal F(n−1) of an $(n-1)^{th}$ frame (that is, the previous frame), and the filtering coefficient W(n) of the $n^{th}$ frame that are extracted from each of the corresponding coordinates.

First, the filtering coefficient W(n) is calculated using the sensing signal I(n) of the input $n^{th}$ frame, the output signal F(n−1) of the $(n-1)^{th}$ frame, and a scale constant R. The filtering coefficient W(n) functions as a weight to average the current sensing signal I(n) and the previous output signal F(n−1) when calculating the current output signal F(n), though it is not required that 0≤W(n)≤1. As illustrated in EQUATION 2, the filtering coefficient W(n) is calculated by subtracting the output signal F(n−1) of the $(n-1)^{th}$ frame from the sensing signal I(n) of the $n^{th}$ frame, obtaining the absolute value of this difference, and dividing the obtained absolute value by the scale constant R.

The scale constant R may be set to an arbitrary nonzero value. In particular, the scale constant R is preferably the value such that the range of the filtering coefficient W(n) satisfies 0≤W(n)≤1. For example, R can be set to a maximum (or maximum possible) value $I_{max}$ for a sensing signal.

When the filtering coefficient W(n) is calculated, the sensing signal I(n) of the $n^{th}$ frame is multiplied by the filtering coefficient W(n), the output signal F(n−1) of the $(n-1)^{th}$ frame is multiplied by one minus the filtering coefficient W(n) (that is, by 1−W(n)), and the calculated values are added to each other so that the output signal F(n) of the $n^{th}$ frame is calculated. Accordingly, unlike other techniques that may use fixed filtering coefficients (that is, uniformly valued across frames), the filtering coefficient W(n) in the above-described embodiment does not take on uniform values across frames. Rather, the filtering coefficient W(n) changes each frame to reflect a difference between the sensing signal I(n) of the $n^{th}$ frame and the output signal F(n−1) of the $(n-1)^{th}$ frame. The amount of this change may then be automatically reflected in the output signal F(n) of the $n^{th}$ frame, such that a touch sensing system adaptive to a changing environment may be realized.

In the operation processes of the filter unit 30, since an operation (such as division or multiplication operations) using the output signal F(n−1) of the $(n-1)^{th}$ frame (that is, a previous frame) is performed, processing time is spent carrying out these operations, which can introduce delay time. In order to reduce such delay time, a touch sensing system according to a second embodiment of the present invention further includes a condition unit 20. This touch sensing system will now be described with reference to FIGS. 3-4.

Figure 3:
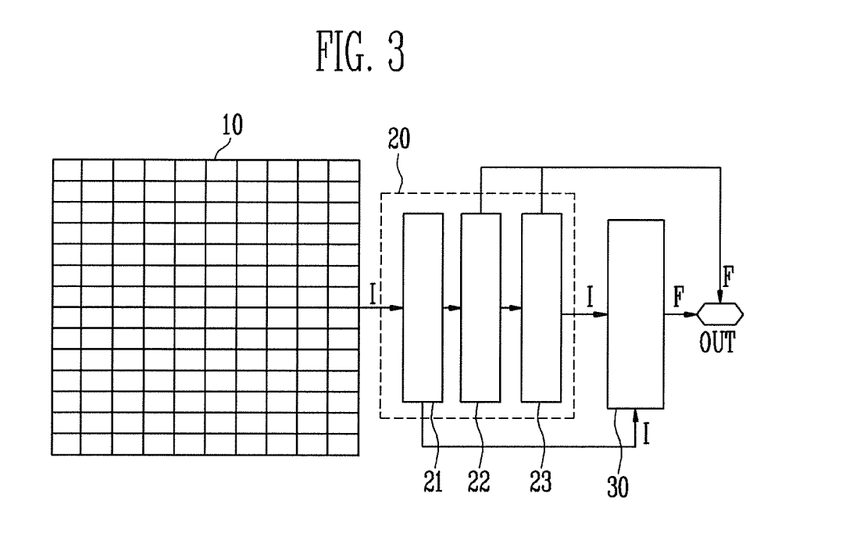
FIG. 3 is a view illustrating a touch sensing system according to a second embodiment of the present invention.

FIG. 3 is a view illustrating a touch sensing system according to a second embodiment of the present invention.

The condition unit 20 includes a first sub condition unit 21, a second sub condition unit 22, and a third sub condition unit 23 for determining whether the sensing signal I(n) of the input $n^{th}$ frame satisfies specific conditions. According to the first embodiment, the sensing signal I detected by the touch sensing unit 10 is directly input to the filter unit 30. However, according to the second embodiment, the sensing signal I is input to the filter unit 30 through the condition unit 20 or is directly output to the output end OUT of the filter unit 30 as an output signal F when the specific conditions of the condition unit 20 are satisfied.

Figure 4:
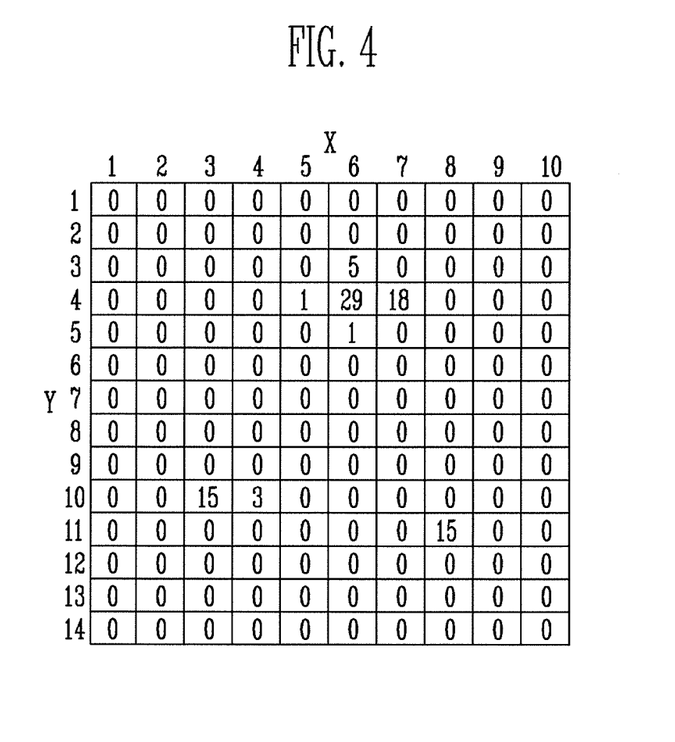
FIG. 4 is a view illustrating an exemplary sensing signal of an $n^{th}$ frame as used by the touch sensing system of FIG. 3.

FIG. 4 is a view illustrating an exemplary sensing signal of an $n^{th}$ frame as used by the touch sensing system of FIG. 3. The condition unit 20 will be described with reference to FIG. 4 as one example.

First, the first sub condition unit 21 supplies the sensing signal I(n) to the filter unit 30 when the sensing signal I(n) of the $n^{th}$ frame of input specific coordinates is no more than a first reference value, and transmits the sensing signal I(n) to the second sub condition unit 22 when the sensing signal I(n) of the $n^{th}$ frame of the input specific coordinates is larger than the first reference value.

The above condition is for removing basic noise generated by a peripheral environment. For example, when the first reference value is set to 3, since the sensing signal 1 of the coordinates (5, 4) is no more than 3, the sensing signal 1 is supplied to the filter unit 30 and the sensing signal 29 of the coordinates (6, 4) is transmitted to the second sub condition unit 22 instead of to the filter unit 30.

Then, the second sub condition unit 22 transmits the sensing signal to the third sub condition unit 23 when the sum obtained by adding the sensing signal transmitted from the first sub condition unit 21 to the sensing signals of the coordinates adjacent to the coordinates of the sensing signal is no more than a second reference value, and directly supplies the sensing signal to the output end OUT without passing through the filter unit 30 when the sum obtained by adding the sensing signal transmitted from the first sub condition unit 21 to the sensing signals of the coordinates adjacent to the coordinates of the sensing signal is larger than the second reference value.

The above condition is for determining when a large area is touched. For example, when the second reference value is set to 30, in the coordinates (3, 10), since the sum obtained by adding the sensing signal 15 to the sensing signal 3 of the adjacent coordinates is 18, which is smaller than the second reference value, the sensing signal 15 of the coordinates (3, 10) is transmitted to the third sub condition unit 23. Further, in the coordinates (6, 3), since the sum obtained by adding the sensing signal 5 to the sensing signals 1, 29, and 18 of adjacent coordinates is 53, which is larger than the second reference value, the sensing signal 5 of the coordinates (6, 3) is output as an output signal F to the output end OUT of the filter unit 30.

The third sub condition unit 23 supplies the sensing signal transmitted from the second sub condition unit 22 to the filter unit 30 when the sensing signal is no more than a third reference value and transmits the sensing signal to the output end OUT of the filter unit 30 when the sensing signal is larger than the third reference value.

The above is a condition for determining when a small area is touched. For example, when the third reference value is set to 10, since the sensing signal 5 of the coordinates (6, 3) is smaller than the third reference value, the sensing signal 5 is supplied to the filter unit 30. However, since the sensing signal 15 of the coordinates (3, 10) is larger than the third reference value, the sensing signal 5 is directly output to the output end OUT of the filter unit 30 as an output signal F without passing through the operation of the filter unit 30.

As described above, when the sensing signal I corresponds to the specific conditions due to the condition unit 20, since the sensing signal I is directly output as the output signal F without passing through the operation of the filter unit 30, the operation time of the filter unit 30 may be reduced.

The first reference value, the second reference value, and the third reference value may be variously set in accordance with the specification and use environment of the touch sensing system. Since the first reference value is used as the condition of removing basic noise, the first reference value is preferably set to be smaller than the third reference value. Since the second reference value is the condition of determining the case in which a large area is touched, the second reference value is preferably set to be larger than the first reference value and the third reference value.

Figure 5:
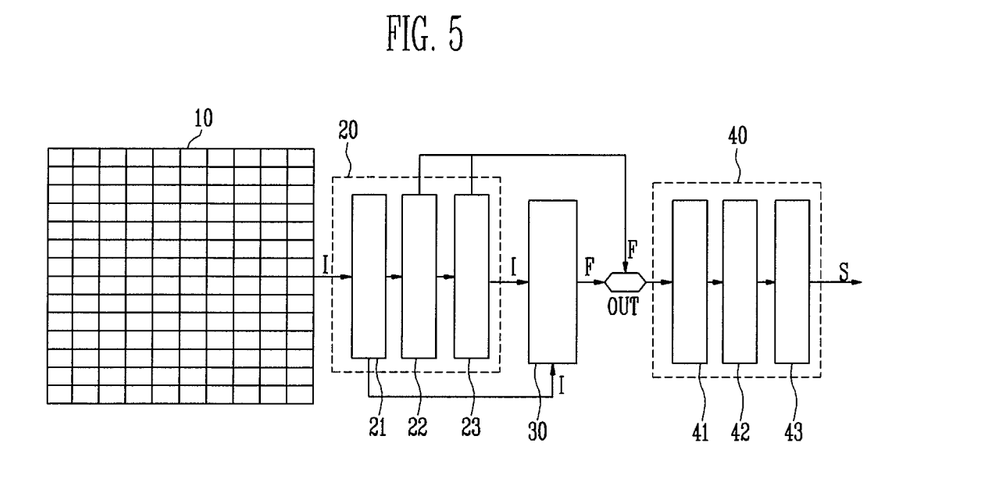
FIG. 5 is a view illustrating a touch sensing system according to a third embodiment of the present invention.

FIG. 5 is a view illustrating a touch sensing system according to a third embodiment of the present invention. FIGS. 6A, 6B, 6C, and 6D are views illustrating the touch map unit of FIG. 5.

Figure 6A:
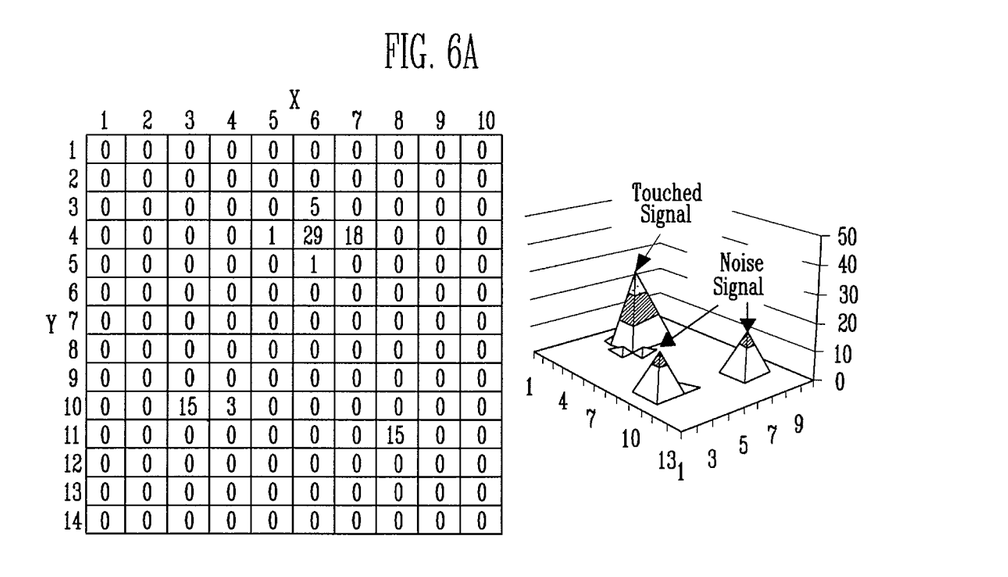
FIGS. 6A, 6B, 6C, and 6D are views illustrating the touch map unit of FIG. 5.

In FIG. 6A, the output signal F(n) of the $n^{th}$ frame output to the output end OUT of the filter unit 30 is illustrated. Sensing signals are detected in the coordinates (3, 10), (4, 10), and (8, 11) in areas other than an actually touched area around the coordinates (6, 4) due to the noise of a peripheral environment. Therefore, errors are generated when these other X and Y coordinates are detected.

Accordingly, the touch sensing system according to the third embodiment of the present invention further includes a touch map unit 40. The touch map unit 40 includes a replacing unit 41, a comparing unit 42, and an operating unit 43.

Figure 6B:
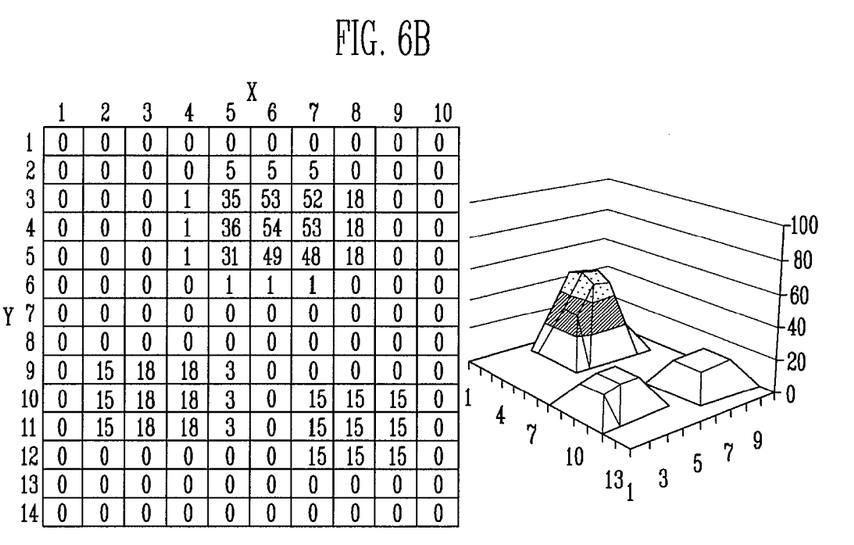
Figure 6C:
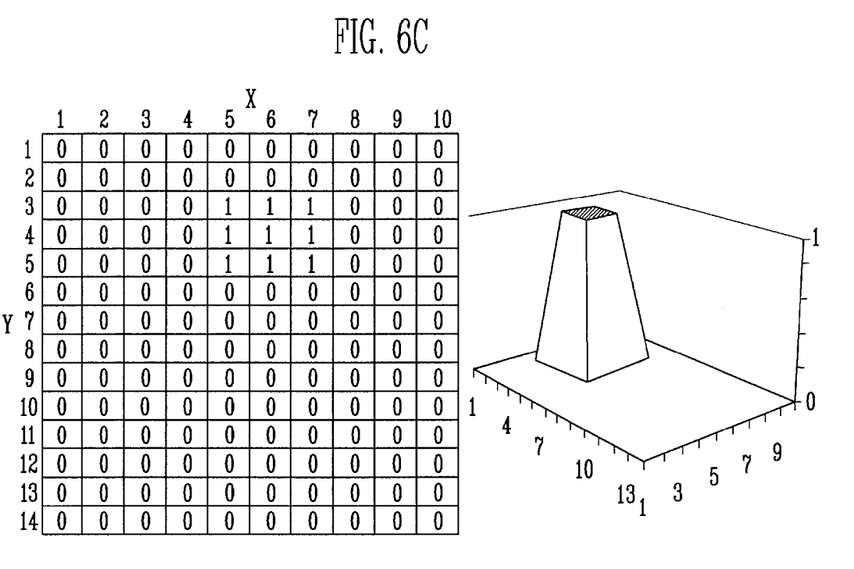

The replacing unit 41 replaces the output signal F(n) of the $n^{th}$ frame output to the output end OUT of the filter unit 30 by the sum obtained by adding the sensing signals of adjacent coordinates. For example, the output signal F(n) of the $n^{th}$ frame of each coordinates illustrated in FIG. 6A is replaced as illustrated in FIG. 6B. For example, in the sensing signal 1 of the coordinates (5, 4) of FIG. 6A, the sensing signal 1 is replaced by the sum 36 obtained by adding the sensing signal 1 to the sensing signals 5, 29, and 1 of adjacent coordinates. Likewise, the other sensing signals are replaced by their corresponding sums including their adjacent sensing signals.

The comparing unit 42 replaces this sum by 0 when the sum is no more than a fourth reference value and replaces the sum by 1 when the sum is larger than the fourth reference value. For example, when the fourth reference value is set to 20, the sums larger than 20 among the sums in FIG. 6B are replaced by 1 and the sums no more than 20 are replaced by 0 so that the sums illustrated in FIG. 6C exist. Therefore, only the actually touched area has the value of 1, and the other (noise) parts are replaced by 0. The fourth reference value may be variously set in accordance with the specification and the use environment of the touch sensing system.

Figure 6D:
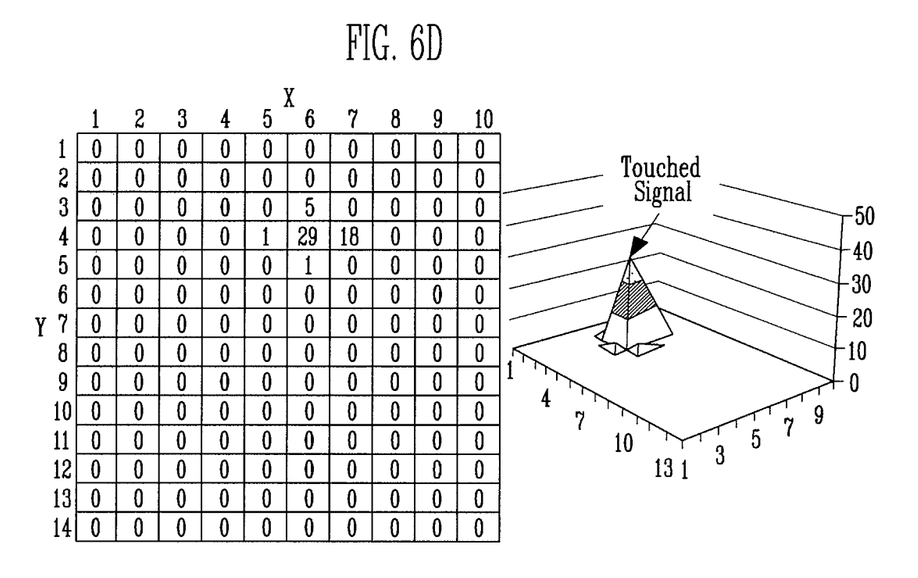

The operating unit 43 multiplies the output signal F by the 0 or 1 generated by the comparing unit 42 to output a final coordinate signal S. That is, the output signal F(n) of the $n^{th}$ frame illustrated in FIG. 6A is multiplied by 0 or 1 (FIG. 6C) generated by the comparing unit 42 to output the final coordinate signal S of each corresponding coordinates as illustrated in FIG. 6D. As a result, as illustrated in FIG. 6D, the output signal of the actually touched region exists, while the other (noise) signals are removed. Therefore, coordinate detecting ability may be improved.

Touch Sensing Methods

The touch sensing method according to the first embodiment of the present invention includes a filtering process. In the filtering process, the output signal F(n) of the $n^{th}$ frame is calculated from the sensing signal I(n) of the $n^{th}$ frame output from the touch sensing unit 10 and from the output signal F(n−1) of the (n−1)$^{th}$ frame using EQUATIONS 1 and 2 above.

The touch sensing method according to the second embodiment of the present invention further includes a first condition process, a second condition process, and a third condition process. The respective condition processes are sequentially performed before the filtering process.

In the first condition process, the sensing signal I(n) of the $n^{th}$ frame output from the touch sensing unit 10 is received (by, for example, the filtering unit 30 in FIG. 3) to perform the filtering process when the sensing signal I(n) of the $n^{th}$ frame is no more than the first reference value, and is received (by the second sub condition unit 22 in FIG. 3) to perform the second condition process when the sensing signal I(n) of the $n^{th}$ frame is larger than the first reference value.

In the second condition process, when the sum obtained by adding the sensing signal I transmitted from the first condition process to the sensing signals of the adjacent coordinates is no more than the second reference value, the sensing signal is transmitted to the third condition process (that is, to the third sub condition unit 23 in FIG. 3). When the sum obtained by adding the sensing signal I transmitted from the first condition process to the sensing signals of the adjacent coordinates is larger than the second reference value, the sensing signal is output to the output end OUT as the output signal F(n) of the $n^{th}$ frame.

In the third condition process, when the sensing signal transmitted from the second condition process is no more than a third reference value, the filtering process is performed (by the filtering unit 30 in FIG. 3). When the sensing signal transmitted from the second condition process is larger than the third reference value, the sensing signal is output to the output end OUT as the output signal F(n) of the $n^{th}$ frame.

The first reference value, the second reference value, and the third reference value may be variously set in accordance with the specification and the use environment of the touch sensing system. Since the first reference value is used for the condition of removing basic noise, the first reference value is preferably set to be smaller than the third reference value. Since the second reference value is the condition of determining the case in which a large area is touched, the second reference value is preferably set to be larger than the first reference value and the third reference value.

The touch sensing method according to the third embodiment of the present invention further includes a replacing process, a comparing process, and an operating process. In the replacing process, the output signal F(n) of the $n^{th}$ frame output to the output end OUT is replaced by the sum obtained by adding the sensing signals of adjacent coordinates to each other. In the comparing process, when the sum from the replacing process is no more than the fourth reference value, the sum is replaced by 0. When the sum is larger than the fourth reference value, the sum is replaced by 1. In the operating process, the 0 or 1 generated by the comparing process is multiplied by the output signal to output the resulting product.

Since detailed description of the respective processes was described by the above touch sensing system, the description will not be repeated.

Recording Medium

In addition, the touch sensing methods according to the first embodiment, the second embodiment, and the third embodiment may be realized by a program recorded in a recording medium that may be read or performed by a computer.

The recording medium may be, for example, a magnetic, optical, or electronic apparatus, UV ray or semiconductor system, apparatus, and device, or an electro-wave medium. However, the recording medium is not limited to the above. Specific examples of the recording medium may include a computer disc (magnetic), a random access memory (RAM) (electronic), a read only memory (ROM) (electronic), an electrically erasable programmable read only memory (EEPROM) or a flash memory (electronic), optical fiber (optical), or an optical medium such as a digital versatile disc (DVD) or a compact disc read only memory (CDROM).

In addition, the recording medium may be paper to which a program is printed or another proper medium on which the program is stored since the program may be stored in a computer memory after the program is electronically captured through optical scanning of paper or appropriate reading of the other medium, and is then compiled, interpreted, or processed by a proper method as a computer or computing unit demands.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch sensing method for a touch-sensitive screen of an image display device, the touch sensing method comprising, for each frame after a first frame of a plurality of frames:

calculating an output touch signal of an $n^{th}$ frame, n≥2, from a touch sensing signal of the $n^{th}$ frame output from a touch sensing unit configured to sense touches of the touch-sensitive screen to perform a filtering process, the calculating using an equation $$F(n) = I(n) \times \frac{|I(n) - F(n-1)|}{R} + F(n-1) \times \left(1 - \frac{|I(n) - F(n-1)|}{R}\right),$$

wherein F(n) represents the output touch signal of the $n^{th}$ frame, I(n) represents the touch sensing signal of the $n^{th}$ frame, F(n−1) represents an output touch signal of an (n−1)$^{th}$ frame, and R represents a scale constant satisfying $$0 < \frac{|I(n) - F(n-1)|}{R} < 1;$$

and outputting the output touch signal of the $n^{th}$ frame to an output end.

2. The touch sensing method as claimed in claim 1, further comprising:

in a first condition process, receiving the touch sensing signal of the $n^{th}$ frame output from the touch sensing unit, performing the filtering process when the touch sensing signal of the n$^{th}$ frame is no more than a first reference value, and transmitting the touch sensing signal to a second condition process when the touch sensing signal of the n$^{th}$ frame is larger than the first reference value;

in the second condition process, transmitting the touch sensing signal to a third condition process when a sum obtained by adding the touch sensing signal transmitted from the first condition process to touch sensing signals of adjacent coordinates is no more than a second reference value, and outputting the touch sensing signal to the output end as the output touch signal of the n$^{th}$ frame when the sum is larger than the second reference value; and in the third condition process, performing the filtering process when the touch sensing signal transmitted from the second condition process is no more than a third reference value, and outputting the touch sensing signal to the output end as the output touch signal of the n$^{th}$ frame when the touch sensing signal transmitted from the second condition process is larger than the third reference value.

3. The touch sensing method as claimed in claim 2, wherein the third reference value is larger than the first reference value.

4. The touch sensing method as claimed in claim 2, wherein the second reference value is larger than the first reference value and the third reference value.

5. The touch sensing method as claimed in claim 1, further comprising:

replacing the output touch signal of the n$^{th}$ frame output to the output end by a sum obtained by adding touch sensing signals of adjacent coordinates to each other;

replacing the sum by 0 when the sum is no more than a fourth reference value and replacing the sum by 1 when the sum is larger than the fourth reference value to perform a comparing process; and multiplying the 0 or 1 generated by the comparing process by the output touch signal of the n$^{th}$ frame.

6. A non-transitory computer readable medium for recording a program of realizing a touch sensing method for a touch-sensitive screen of an image display device, the touch sensing method comprising, for each frame after a first frame of a plurality of frames:

calculating an output touch signal of an n$^{th}$ frame, n≥2, from a touch sensing signal of the n$^{th}$ frame output from a touch sensing unit configured to sense touches of the touch-sensitive screen to perform a filtering process, the calculating using an equation $$F(n) = I(n) \times \frac{|I(n) - F(n-1)|}{R} + F(n-1) \times \left(1 - \frac{|I(n) - F(n-1)|}{R}\right),$$

wherein F(n) represents the output touch signal of the n$^{th}$ frame, I(n) represents the touch sensing signal of the n$^{th}$ frame, F(n−1) represents an output touch signal of an (n−1)$^{th}$ frame, and R represents a scale constant satisfying $$0 < \frac{|I(n) - F(n-1)|}{R} < 1;$$

and outputting the output touch signal of the n$^{th}$ frame to an output end.

7. The non-transitory computer readable medium as claimed in claim 6, wherein the touch sensing method further comprises:

in a first condition process, receiving the touch sensing signal of the n$^{th}$ frame output from the touch sensing unit, performing the filtering process when the touch sensing signal of the n$^{th}$ frame is no more than a first reference value, and transmitting the touch sensing signal to a second condition process when the touch sensing signal of the n$^{th}$ frame is larger than the first reference value;

in the second condition process, transmitting the touch sensing signal to a third condition process when a sum obtained by adding the touch sensing signal transmitted from the first condition process to touch sensing signals of adjacent coordinates is no more than a second reference value, and outputting the touch sensing signal to the output end as the output touch signal of the n$^{th}$ frame when the sum is larger than the second reference value; and in the third condition process, performing the filtering process when the touch sensing signal transmitted from the second condition process is no more than a third reference value, and outputting the touch sensing signal to the output end as the output touch signal of the n$^{th}$ frame when the touch sensing signal transmitted from the second condition process is larger than the third reference value.

8. The non-transitory computer readable medium as claimed in claim 7, wherein the third reference value is larger than the first reference value.

9. The non-transitory computer readable medium as claimed in claim 7, wherein the second reference value is larger than the first reference value and the third reference value.

10. The non-transitory computer readable medium as claimed in claim 6, wherein the touch sensing method further comprises:

replacing the output touch signal of the n$^{th}$ frame output to the output end by a sum obtained by adding touch sensing signals of adjacent coordinates to each other;

replacing the sum by 0 when the sum is no more than a fourth reference value and replacing the sum by 1 when the sum is larger than the fourth reference value to perform a comparing process; and multiplying the 0 or 1 generated by the comparing process by the output touch signal of the n$^{th}$ frame.

11. A touch sensing system, comprising:

a touch-sensitive screen of an image display device, the touch-sensitive screen comprising a touch sensing unit configured to sense touches of the touch-sensitive screen; and a filter unit for calculating, for each frame after a first frame of a plurality of frames, an output touch signal of an n$^{th}$ frame, n≥2, from a touch sensing signal of the n$^{th}$ frame output from the touch sensing unit using an equation $$F(n) = I(n) \times \frac{|I(n) - F(n-1)|}{R} + F(n-1) \times \left(1 - \frac{|I(n) - F(n-1)|}{R}\right),$$

wherein F(n) represents the output touch signal of the n$^{th}$ frame, I(n) represents the touch sensing signal of the n$^{th}$ frame, F(n−1) represents an output touch signal of an (n−1)$^{th}$ frame, and R represents a scale constant satisfying $$0 < \frac{|I(n) - F(n-1)|}{R} < 1;$$

and outputting the output touch signal of the n$^{th}$ frame to an output end.

12. The touch sensing system as claimed in claim 11, further comprising a first sub condition unit, a second sub condition unit, and a third sub condition unit, wherein:
   the first sub condition unit is for receiving the touch sensing signal of the n$^{th}$ frame output from the touch sensing unit, for supplying the touch sensing signal to the filter unit when the touch sensing signal of the n$^{th}$ frame is no more than a first reference value, and for transmitting the touch sensing signal to the second sub condition unit when the touch sensing signal of the n$^{th}$ frame is larger than the first reference value;
   the second sub condition unit is for transmitting the touch sensing signal to the third sub condition unit when a sum obtained by adding the touch sensing signal transmitted from the first sub condition unit to touch sensing signals of adjacent coordinates is no more than a second reference value, and for outputting the touch sensing signal to the output end of the filter unit as the output touch signal of the n$^{th}$ frame when the sum is larger than the second reference value; and
   the third sub condition unit is for supplying the touch sensing signal transmitted from the second sub condition unit to the filter unit when the touch sensing signal is no more than a third reference value, and for outputting the touch sensing signal to the output end of the filter unit as the output touch signal of the n$^{th}$ frame when the touch sensing signal is larger than the third reference value.

13. The touch sensing system as claimed in claim 12, wherein the third reference value is larger than the first reference value.

14. The touch sensing system as claimed in claim 12, wherein the second reference value is larger than the first reference value and the third reference value.

15. The touch sensing system as claimed in claim 11, further comprising:
   a replacing unit for replacing the output touch signal of the n$^{th}$ frame output to the output end of the filter unit by a sum obtained by adding touch sensing signals of adjacent coordinates to each other;
   a comparing unit for replacing the sum by 0 when the sum is no more than a fourth reference value, and for replacing the sum by 1 when the sum is larger than the fourth reference value; and
   an operating unit for multiplying the 0 or 1 generated by the comparing unit by the output touch signal of the n$^{th}$ frame.

* * * * *